Oct. 17, 1944.                F. B. TUTTLE                2,360,743
                          ARC WELDING APPARATUS
                          Filed Sept. 10, 1943
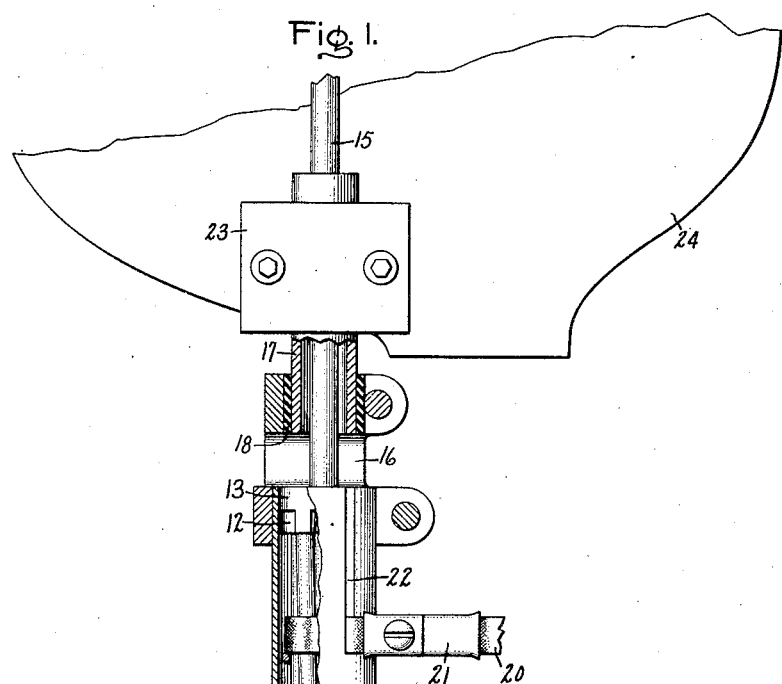
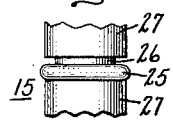
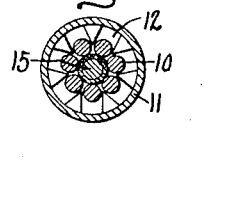
Inventor:
Frank B. Tuttle,
by Harry E. Dunham
His Attorney.

Patented Oct. 17, 1944

2,360,743

UNITED STATES PATENT OFFICE 2,360,743

ARC WELDING APPARATUS

Frank B. Tuttle, Norristown, Pa., assignor to General Electric Company, a corporation of New York Application September 10, 1943, Serial No. 501,813

9 Claims. (Cl. 314—129)

My invention relates to arc welding apparatus and more particularly to a contact mechanism for supplying welding current to an arc welding electrode.

My invention is particularly applicable to automatic arc welding machines in which an electrode is fed toward and away from the work to strike and maintain a welding arc. Since the electrode is consumed during welding and is usually fed toward and from the work to strike the arc, the contact mechanism for introducing current thereto must permit lengthwise travel of the electrode relative thereto. Furthermore, the contact mechanism should be suitable for supplying current to electrodes having a bare or lightly coated exterior as well as to electrodes having thereon a heavy, insulating coating of fluxing material through which project longitudinally spaced current carrying contacts mounted on or forming a part of the electrode. Continuous lengths of electrode material having a heavy, insulating flux coating thereon may also be formed by joining short lengths thereof in end-to-end engagement and providing each section with one or more electrically conductive portions which extend to or slightly beyond the flux coating. These current carrying contacts for supplying welding current through the heavy, insulating flux coating may be brought into engagement with a contact mechanism which provides a substantially continuous contact zone of a length exceeding the distance between them.

It is an object of my invention to provide a new and improved contact mechanism suitable for bare electrodes or flux coated electrodes of the above described type.

It is also an object of my invention to provide a contact mechanism in which the welding current is supplied to an electrode through the agency of a plurality of electrically conductive rods held in lengthwise engagement with a longitudinal surface portion of an arc welding electrode located therebetween.

It is also an object of my invention to supply welding current to an electrode through the agency of electrically conductive resilient rods which are twisted and held together about a longitudinal surface portion of an electrode located therebetween.

Further objects of my invention will become apparent from the following description of one embodiment thereof which is illustrated in the accompanying drawing.

In this drawing Fig. 1 is a view partly in section of a contact mechanism embodying my invention, Fig. 2 is a cross section along lines 2—2 of Fig. 1, and Fig. 3 is an illustration of the joint construction of the heavily coated electrode shown in Figs. 1 and 2. This electrode is formed of heavily coated electrode material, short lengths of which are welded together at their ends where a contact ring is provided for supplying welding current to the core of the resulting electrode.

In accordance with my invention one terminal of a source of welding current is connected to an arc welding electrode through the agency of one or more electrically conductive rods which make a lengthwise engagement with a longitudinal surface portion of the electrode. These rods are laterally spaced from one another by guides which direct their travel toward and away from the electrode located in the longitudinal passageway therebetween. They may be held against the electrode by means of an encircling helical spring extending lengthwise thereof. They may also be held in engagement with the electrode by twisting them together about it through the agency of means acting on the rods and rotatable relatively to one another about the axis of the electrode. The assembly embodying the rods is preferably supported on and insulated from the electrode feeding mechanism.

In the embodiment of my invention illustrated in the drawing a plurality of current conducting resilient rods 10 are enclosed within a support 11. These rods may be formed of copper or a copper alloy such as beryllium copper. In the arrangement shown, rods 10 are round and support 11 is a tubular member. The ends of rods 10 are tapered and seated in slots 12 of rod holders 13 and 14 located in the upper and lower ends of support 11. Slots 12 are of uniform width and are radially disposed relative to electrode passageways extending through the central portions of the rod holders. The arc welding electrode 15 extends through these passageways in the rod holders and through the passageway formed between rods 10.

Rod holder 13 is cylindrical in form and held in the upper portion of tubular support 11 by the lower portion of a double clamp 16 whose upper portion engages and is supported by a tube 17 from which it is insulated by a bushing of insulating material 18. Rod holder 14 is also cylindrical and makes a threaded engagement with the lower end portions of tubular support 11. It consequently may be rotated in support 11 relatively to rod holder 13 about electrode 15 extending therethrough. A rotational force may be applied to rod holder 14 by means of pliers or a pipe wrench which engages the rod holder beyond its threaded portion where its diameter is reduced to form a projecting end portion.

Rods 10 are spaced from one another and guided in their movements toward and from the electrode by slots 12 in each of the rod holders 13 and 14. These rods may be held in engagement with the electrode through the agency of an encircling helical spring 19 extending lengthwise thereof and exerting a constructive force thereon. This spring also serves to hold rods 10 in assembled relationship before an electrode is inserted therebetween. Under certain circumstances the pressure thus exerted between rods 10 and the electrode 15 may not be sufficient and I consequently also provide means for forcing the rods into engagement with the electrode by twisting them together about the same in much the same manner as the outer strands of a cable are twisted about the core wire of a cable. This may be accomplished by rotating rod holder 14 relatively to rod holder 13 and support 11 in order to wrap each rod about the electrode as shown in Fig. 1 of the drawing. The beveled ends of the rods permit displacement of the rods to the positions shown in the drawing.

In the arrangement illustrated, the threaded engagement between rod holder 14 and support 11 is sufficient to hold rod holder 14 with that relative rotational displacement which twists rods 10 about and into frictional engagement with the longitudinal portion of electrode 15 located between these rods. It is apparent that other connections than the threaded one illustrated may be employed for holding the desired adjustment of rod holder 14 relative to rod holder 13. Thus, for example, a set screw or jamb nut may be used.

One terminal of a source of welding current is connected to one or more and preferably each of rods 10 through the agency of a conductor 20. This conductor may be a braided strap of conductive material such as copper. The end of this strap may be looped and held about the upper ends of rods 10 by a clamp 21. This looped end of strap 20 extends through a slot 22 in the upper portion of support 11. By adjusting clamp 21 a suitable construction of the looped portion of strap 20 may be made to firmly hold it in good current conducting engagement with each of rods 10. Of course other means may be employed for connecting one or more of rods 10 to the welding current conductor.

The assembly thus far described may be supported by tube 17 which is clamped in a bracket 23 forming part of an automatic arc welding head 24 which operates to feed electrode 15 toward and away from the work to strike and maintain a welding arc.

The contact mechanism above described may be used for supplying welding current to bare or lightly coated electrodes as well as to electrodes having thereon a heavy, insulating flux coating through which project longitudinally spaced current carrying contacts mounted on or forming a part of the electrode. It is also applicable for supplying welding current to electrodes having a heavy insulating flux coating thereon when such electrodes are formed by joining in end-to-end engagement short lengths thereof each of which is provided with one or more contact rings or other means for introducing current into the core of the electrode. In fact, such an electrode is shown at 15 in Fig. 3 of the drawing where the abutting ends of the longitudinal sections thereof are welded together and provided near the joint between them with a ring 25 which engages the core 26 of the resulting electrode and extends slightly beyond the flux coating 27 thereon as shown in Fig. 3 which is an enlarged view of a joint in the electrode 15 of Fig. 1. The current carrying contact or contacts of each length of electrode material may be spaced several inches from their ends so that their usefulness as contacts will not be impaired by the welding operation employed for joining them in end to end engagement. Especially is this true where the joint is made by arc welding since the heat of the arc or weld spatter may partially or wholly destroy the current carrying capabilities of contacts located adjacent the point of welding.

My contact mechanism is suitable for supplying welding current to heavily coated electrodes of the type referred to above when as illustrated, the rods 10 thereof form a contact zone of a length exceeding the distance between the contact areas projecting through the flux coating on the electrode, so that before one of these contacts passes beyond the contact zone of rods 10, another enters this zone and consequently the supply of welding current to the electrode is not interrupted.

It is obvious that many modifications may be made of my invention without departing from the spirit and scope thereof. Thus, for example, the contact mechanism may be suitably cooled by fluid means, and other means than those disclosed may be employed for holding, guiding and twisting the contact rods into engagement with an electrode located therebetween. These and other variations will occur to those skilled in the art in view of the embodiment above described.

What I claim as new and desire to secure by Letters Patent of the United States, is:

1. Arc welding apparatus comprising an electrically conductive resilient rod, means for twisting and holding said rod about a longitudinal surface portion of an arc welding electrode located adjacent thereto, and means for connecting said rod to one terminal of a source of welding current.

2. Arc welding apparatus comprising a plurality of electrically conductive rods, means for laterally spacing said rods from one another to form an electrode passageway extending lengthwise of and between said rods and for guiding the travel of said rods in directions radial to said electrode passageway, resilient means for holding said rods in lengthwise engagement with a longitudinal surface portion of an electrode in said passageway, and means for connecting said rods to one terminal of a source of welding current.

3. Arc welding apparatus comprising a plurality of electrically conductive resilient rods laterally spaced from one another to form a longitudinal passageway therebetween for an electrode, means for twisting and holding said rods together about a longitudinal surface portion of an electrode in said passageway, and means for connecting said rods to one terminal of a source of welding current.

4. Arc welding apparatus comprising a plurality of electrically conductive resilient rods, means for laterally spacing said rods from one another to form an electrode passageway extending lengthwise of and between said rods and for guiding the travel of said rods in directions radial to said electrode passageway, resilient means for holding said rods in lengthwise engagement with a longitudinal surface portion of an electrode in said passageway, means for twisting and holding said rods together about a longitudinal surface portion of an electrode in said passageway, and means for connecting said rods to one terminal of a source of welding current.

5. Arc welding apparatus comprising means including a plurality of resilient rods for supplying welding current to an electrode, a plurality of spaced members having guides which engage and laterally space said rods from one another lengthwise of an electrode extending through aligned passageways in said members, means for supporting one of said members for rotational adjustment relative to the other of said members about an electrode extending through said passageways in said members, and connections between said supporting means and said members for holding said members with that relative rotational displacement which twists said rods together about and into frictional engagement with a longitudinal portion of an electrode located between said members.

6. Arc welding apparatus comprising a plurality of rod holders having aligned electrode passageways and guide slots of uniform width radially disposed relative thereto, a plurality of current conducting resilient rods having tapered end portions in said slots, means for connecting one terminal of a source of welding current to said rods, means for supporting one of said rod holders for rotational adjustment relative to the other of said rod holders about an electrode extending through said aligned passageways therein, and connections between said supporting means and said rod holders for holding said rod holders with that relative rotational displacement which twists said rods together about and into frictional engagement with a longitudinal portion of an electrode located between said rod holders.

7. Arc welding apparatus comprising a tubular support, a plurality of current conducting resilient rods within said tubular support and extending lengthwise thereof about an electrode extending through said tubular support, an electrical connection extending through said tubular support into current conducting engagement with said rods, resilient means extending lengthwise of said rods and acting thereon to press them into engagement with an electrode located therebetween, and rod holders spaced lengthwise of said tubular support at opposite ends of said rods, said rod holders having aligned electrode passageways and guide slots radially disposed relative thereto for engaging and laterally spacing said rods about an electrode extending through said passageway.

8. Arc welding apparatus comprising a tubular support, a plurality of current conducting resilient rods within said tubular support and extending lengthwise thereof about an electrode extending lengthwise through said tubular support, an electrical connection extending through said tubular support into current conducting engagement with each of said rods, rod holders in said tubular support at opposite ends of said rods, each of said rod holders having aligned electrode passageways and guide slots which are radially disposed relative thereto for engaging the ends of said rods and laterally spacing them from one another about an electrode extending through said passageways and one of said rod holders being mounted in said tubular support for rotational adjustment relative to the other of said rod holders about an electrode extending through said aligned passageways in said rod holders, and connections between said rod holders and said tubular support which hold said rod holders with that relative rotational displacement which twists said rods together about and into frictional engagement with a longitudinal portion of an electrode located between said rod holders.

9. Arc welding apparatus comprising a tubular support, a plurality of current conducting resilient rods within said tubular support and extending lengthwise thereof about an electrode extending lengthwise through said tubular support, an electrical connection extending through said tubular support into current conducting engagement with each of said rods, resilient means extending lengthwise of said rods and acting thereon to press them into engagement with an electrode located between said rods, rod holders in said tubular support at opposite ends of said rods, each of said rod holders having aligned passageways and guide slots which are radially disposed relative thereto for engaging the ends of said rods and laterally spacing them from one another about an electrode extending through said passageways and one of said rod holders being mounted in said tubular support for rotational adjustment relative to the other of said rod holders about an electrode extending through said passageways in said rod holders, and connections between said rod holders and said tubular support which hold said rod holders with that relative rotational displacement which twists said rods together about and into frictional engagement with a longitudinal portion of an electrode located between said rod holders.

FRANK B. TUTTLE.